United States Patent [19]

Cantin et al.

[11] Patent Number: 5,442,335
[45] Date of Patent: Aug. 15, 1995

[54] CONTROLLER FOR CONTROLLING OPERATION OF AT LEAST ONE ELECTRICAL LOAD OPERATING ON AN AC SUPPLY, AND A METHOD THEREOF

[75] Inventors: Luc Cantin; Mario Deschênes, both of Baie Comeau; Mario D'Amours, Sept Iles, all of Canada

[73] Assignee: I.D. Tek Inc., Baie-Comeau, Canada

[21] Appl. No.: 975,861

[22] Filed: Nov. 13, 1992

[51] Int. Cl.[6] ............................. H02J 1/00; H02J 3/00; H04M 11/04
[52] U.S. Cl. ............................. 340/825.71; 340/310.01; 340/310.04; 307/38; 307/40; 307/31
[58] Field of Search ............................. 340/825.06, 825.07, 340/825.14, 310 A, 310 R, 825.71, 825.73, 825.76, 825.58; 307/3, 31, 35, 38, 40, 39, 86, 73, 17, 27, 87

[56] References Cited

U.S. PATENT DOCUMENTS

| | | | |
|---|---|---|---|
| 4,130,874 | 12/1978 | Pai | 364/514 |
| 4,215,394 | 7/1980 | Galloway et al. | 363/137 |
| 4,308,465 | 12/1981 | Lafuze | 307/87 |
| 4,359,644 | 11/1982 | Foord | 307/40 |
| 4,409,491 | 10/1983 | Schott | 307/87 |
| 4,419,665 | 12/1983 | Gurr et al. | 340/825.06 |
| 4,471,232 | 9/1984 | Peddie et al. | 307/35 |
| 4,626,698 | 12/1986 | Harden, Jr. et al. | 307/38 |
| 4,674,031 | 6/1987 | Siska, Jr. | 307/40 |
| 4,847,781 | 7/1989 | Brown, III et al. | 364/492 |
| 5,191,520 | 3/1993 | Eckevsley | 307/35 |

Primary Examiner—Michael Horabik
Assistant Examiner—David Jung
Attorney, Agent, or Firm—Merchant & Gould, Smith, Edell, Welter & Schmidt

[57] ABSTRACT

A controller is provided for controlling operation of at least one electrical load operating on an AC supply having a typical frequency, the AC supply being provided via power transformers by an electrical power distribution grid. The controller is associated with the load and comprises an input interface for coupling the controller to the grid, a frequency detector for detecting the frequency of the AC supply and producing a signal indicative of the frequency, memory modules for storing preprogrammed commands, a frequency monitor for reading the signal indicative of the frequency and producing frequency data derived thereof, a selector for selecting at least one of the preprogrammed commands with respect to the frequency data, a control unit for producing at least one command signal representative of the selected preprogrammed commands, and an output interface including a device responsive to the command signal for controlling the load. Therefore, the load can be controlled by means of the controller depending on the frequency of the AC supply.

12 Claims, 9 Drawing Sheets

CONTROLLER FOR CONTROLLING OPERATION OF AT LEAST ONE ELECTRICAL LOAD OPERATING ON AN AC SUPPLY, AND A METHOD THEREOF

BACKGROUND OF THE INVENTION

1. Field of the Invention

The invention generally relates to management of loads connected to an electrical power distribution grid, and more particularly to a controller for controlling operation of at least one electrical load operating on an AC supply provided by such a grid.

2. Description of the Prior Art

Due to the number of power failures encountered by power utilities, on the grids they use and the general increase of energy consumption causing critical peaks of electricity production, various devices or systems have evolved in the field for managing electricity distribution on grids and controlling the distribution of the power to the loads connected to these grids.

Known in the art is U.S. Pat. No. 4,471,232 (PEDDIE et al.), which describes a method and an apparatus for controlling loads on an electrical grid. The apparatus, which comprises a switching device, allows an electrical distribution center to shut off the current supplied to the loads according to an established hierarchy defined by associating a given priority level with each load, such that the less important loads are shut down before the more important ones. The apparatus controls the time period during which the loads are disconnected from the grid by means of a timer programmed to that effect. A control signal common to all of the switching devices is generated on the electrical grid and consists of a detectable interruption of the AC supply signal.

Broadcasting on grids control signals containing information in their amplitude is a risky method considering the normal perturbations to which the grids are subjected, generated for example by cutoffs of circuit breakers, terminal commutations of transformers, voltage regulators, and high voltage capacitors, as well as lightening inductions. Errors may happen due to the destruction of the information contained in a control signal, or even worst, the generation of random control signals. In all cases, the results are uncertain and the efficiency of the energy management carried out by such an apparatus is questionable. The control signals might not be well received by each apparatus because of the inherent properties of the grid such as inductance, capacitance and resistance altering the signals. Furthermore, no means has been put in place for carrying out preprogrammed actions depending on the state in which the grid operates, means that can prove useful when for example the grid is subjected to an impending power failure.

Also known in the art is U.S. Pat. No. 4,847,781 (BROWN III et al.), which proposes a system for energy management that can be integrated through an electrical distribution or distribution grid. The devices for controlling electric appliances are intended to receive a common control signal having a high frequency in the range of audio signals, superimposed to the AC supply normally provided by the grid.

Also known in the art is U.S. Pat. No. 4,359,644 (FOORD), which proposes a device for controlling consumer loads, especially when a need to shed loads from the grid under predetermined conditions is expected. Broadcasting of control signals is made through an energy distribution line by magnitude distortion of the AC supply signal, the allowed distortion being up to 0,4% of its power.

Also known in the art, are U.S. Pat. Nos. 4,130,874 (PAI), 4,215,394 (GALLOWAY et al.) and 4,419,665 (GURR al.), which propose various devices for management of grids, applying methods more or less complicated from one another for broadcasting control signals to the devices in an attempt to control operation of the loads connected to the grids.

The prior art documents teach either the amplitude modification of the waveform of the AC supply (the information is contained in the magnitude of the signal) or the generation of an additional signal (such as a signal superimposed to the AC supply) to command operation of a device which in response controls the load's operation or supply. Both methods and the involved control devices lack the ability to "sense" the state in which the grid operates. Those control devices cannot alone, for example, detect a local from a general grid failure, nor can act by themselves in an attempt to avoid the failure of the grid or even minimizing its losses. They only play a passive role in the management of the grid, always waiting orders from a remote commanding device linked to them. Then, intermediary steps have to be performed to determine which commands should be transmitted to the control devices, in the case that commands can still be broadcast through the grid (unless a complete additional communication network is implemented for that purpose, such as some documents have proposed), which means that all the connections shall still be effective, that no cutoff devices or protective equipment on the grid have been actuated.

OBJECTS OF THE INVENTION

It is therefore an object of the present invention to provide a controller and a method for controlling operation of at least one load, which obviates the aforesaid drawbacks of the prior art devices and methods.

It is a further object of the invention to provide such a controller which might play an active role for controlling operation of loads connected to a grid, thereby allowing its effective management.

SUMMARY OF THE INVENTION

According to the present invention, there is provided a controller for controlling operation of at least one electrical load operating on an AC supply having a typical frequency, said AC supply being provided via power transformers by an electrical power distribution grid, said controller being associated with said at least one load and comprising:

an input interface including input terminals for connection to said grid, and an output for producing a signal representative of said AC supply and having the same frequency;

frequency detecting means for detecting the frequency of said AC supply, said frequency detecting means having an input connected to said output of the interface, and an output for producing a signal indicative of said frequency;

memory means for storing preprogrammed commands;

frequency monitoring means connected to the output of said frequency detecting means, for reading the signal indicative of said frequency and producing frequency data derived thereof;

selecting means connected to said frequency monitoring means and said memory means, for selecting at least one of said preprogrammed commands with respect to said frequency data;

control means having an output for producing at least one command signal representative of the at least one of said preprogrammed commands selected by said selecting means; and an output interface including an input connected to said output of the control means, and an output for connection to said at least one load, said output interface including means responsive to the command signal for controlling said at least one load;

whereby said at least one load can be controlled by means of said controller depending on the frequency of said AC supply.

Preferably, said frequency detecting means comprise:

means for detecting zero-crossings of said AC supply; and an interrupt handling circuitry having an input connected to said means for detecting zero-crossings, and an interrupt output for generating interrupt signals at time intervals with respect to said zero-crossings;

and said frequency monitoring means comprise:

clock means for generating pulses at a constant frequency which is substantially higher than the typical frequency of said AC supply;

counting means connected to said clock means, for counting the pulses; and means responsive to said interrupt signals, for determining the frequency of said AC supply or a variation thereof as a function of the pulses counted by said counting means during said time intervals, and producing said frequency data.

According to the present invention, there is also provided a method for controlling operation of at least one electrical load operating on an AC supply having a typical frequency, said AC supply being provided via power transformers by an electrical power distribution grid, said method comprising the steps of:

detecting the frequency of said AC supply and producing a signal indicative of said frequency;

monitoring the detected frequency by reading said signal indicative of the frequency, and producing frequency data derived thereof;

selecting at least one of preprogrammed commands stored in memory means, with respect to said frequency data;

producing at least one command signal representative of the at least one of said preprogrammed commands selected; and controlling said at least one load in response to said at least one command signal;

whereby said at least one load can be controlled depending on the frequency of said AC supply.

BRIEF DESCRIPTION OF THE DRAWINGS

In order to impart full understanding of the manner in which these another objectives are attained in accordance with the present invention, preferred embodiments thereof are described hereinafter with reference to the accompanying drawings wherein.

DESCRIPTION OF PREFERRED EMBODIMENTS

Figure 1:
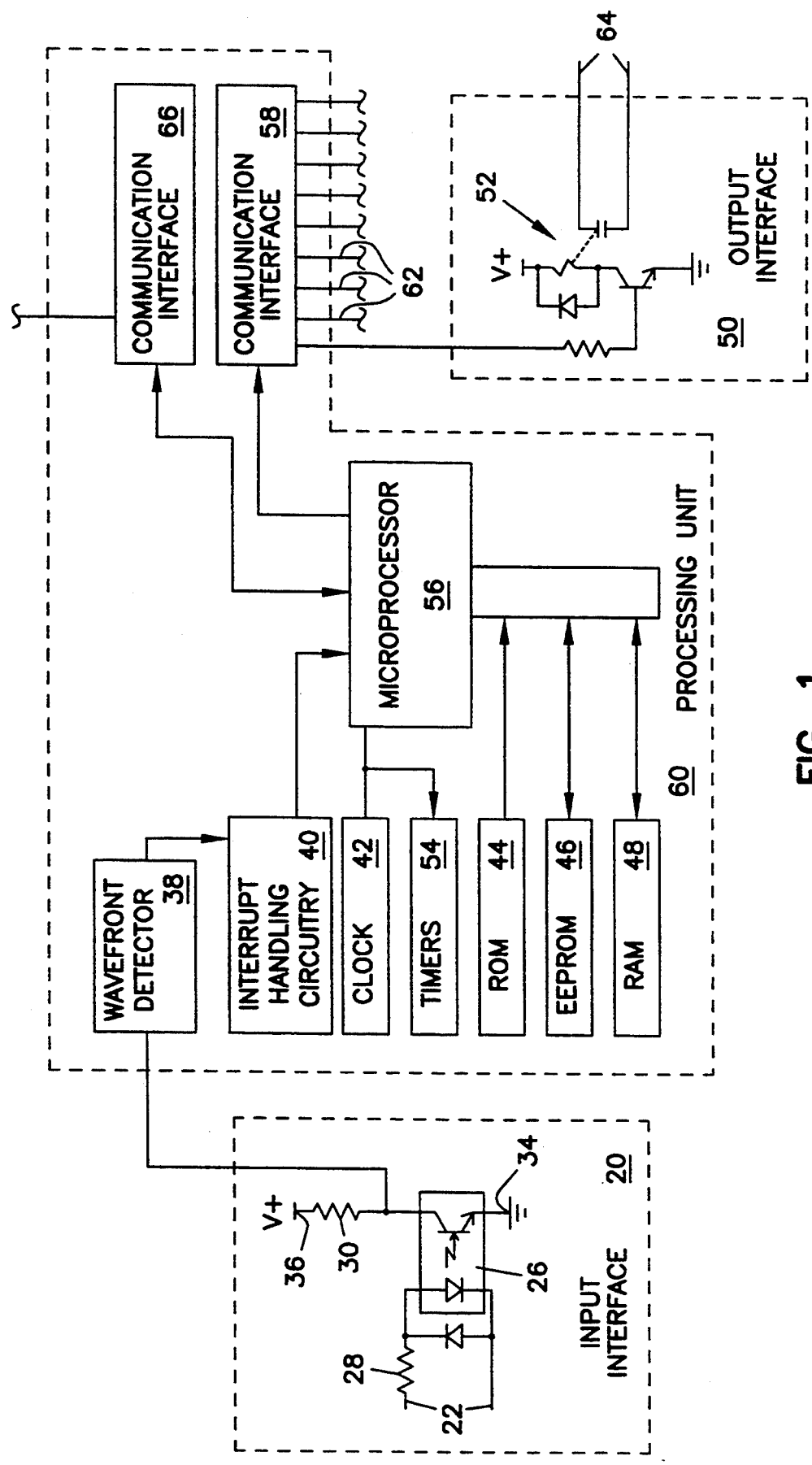
FIG. 1 illustrates a schematic diagram of a controller according to the present invention.

Referring to FIG. 1, there is shown a schematic diagram of a controller according to the invention, for controlling operation of at least one electrical load (not shown in the Figure) operating on an AC supply having a typical frequency (usually 50 or 60 Hz), such as provided via power transformers by an electric power distribution grid. The controller is associated with the load and can be roughly understood as comprising an input interface 20, a processing unit 60 and an output interface 50. The input interface 20 includes input terminals 22 to be connected to the grid, and an output 24 for producing a signal representative of the AC supply and having the same frequency. The input interface 20 comprises an opto-coupler 26 connected between the input terminals 22 and the output 24, for substantially insulating the controller from the grid. The circuit of the input interface 20 is completed with other adequate components such as resistors 28, 30, a diode 32, a ground terminal 34 and a DC voltage source terminal 36.

The controller further comprises a frequency detector including a wave front detector 38 and an interrupt handling circuitry 40, for detecting the frequency of the AC supply and producing a signal indicative of the frequency. The detection of the frequency of the AC supply is achieved by detecting zero-crossings of the AC supply by means of the wave front detector 38 and generating interrupt signals at time intervals with respect to the zero-crossings by means of the interrupt handling circuitry 40. By only detecting, for example, the zero-crossings having a positive slope, the cycles of the AC supply can be observed.

The controller also comprises a frequency monitor for reading the signal indicative of the frequency produced by the frequency detector, and producing frequency data derived thereof. The frequency monitor includes a clock 42 for generating pulses at a constant frequency which is substantially higher than the typical frequency of the AC supply, a counter connected to the clock 42 for counting the pulses, and means responsive to the interrupt signals produced by the interrupt handling circuitry 40, for determining the frequency of the AC supply or a variation thereof as a function of the pulses counted by the counter during the time intervals, and producing the useful frequency data. The counter and the means responsive to the interrupt signals are conveniently embodied in a microprocessor 56.

The controller also comprises memory modules 44, 46, 48 for storing preprogrammed commands for operating the microprocessor 56.

The controller further includes selecting means connected to the frequency monitor and the memory modules 44, 46, 48 for selecting at least one of the preprogrammed commands with respect to the frequency data provided by the frequency monitor. The controller also comprises control means for producing at least one command signal representative of the preprogrammed command(s) selected by the selector. The selecting means and the control means are conveniently embodied in the microprocessor 56.

The controller yet comprises an output interface 50 including a switch 52 responsive to the command signals received from the output 62 of the control unit, for controlling the load. The switch 52 has open and closed states which determine the conductive property of an output 64 for respectively disconnecting from and connecting to the grid the load. The use of a relay in that respect might be preferred to a solid-state switch not only for cost reasons but especially because that a large number of the latter might generate undesirable harmonics on the grid when commutating.

The selecting means comprise means for detecting a substantial drop in the frequency of the AC supply below a threshold value and, on detection of the drop, selecting a first group of the preprogrammed commands for achieving a disconnection of the load from the grid for a first predetermined time period. The selecting means further comprise means for detecting whether a variation in the frequency of the AC supply exceeds a predetermined level and, on detection of the variation exceeding the level, selecting a second group of the preprogrammed command for achieving a disconnection of the load from the grid for the above-mentioned predetermined time period. This time period is provided to give the power utility a chance to locate a fault or stabilize the grid. The time period is of short duration and allows a relatively quick resumption of the AC supply to the loads, making most of the grid operation problems invisible to the consumer. The selecting means also comprise means for detecting an absence of the AC supply and, on detection of the absence, selecting a third group of the preprogrammed commands for achieving a disconnection of the load from the grid for a second time period longer than the first time period. After an electrical failure, this longer second time period allows the grid restoration to take place more easily by forcing a resumption of the AC supply to the loads by predetermined areas.

The operations performed by the selecting means are timed by means of the clock 42 and timers 54. The above-mentioned means for detecting a drop, a variation and an absence can be implemented within the microprocessor 56 as software procedures. The microprocessor 56 is provided with ROM 44, EEPROM 46, and RAM 48 memories, and is preprogrammed with an appropriate software for performing the useful functions of the controller.

The output of the control unit comprises a plurality of output ports 58, so that additional output interfaces (not shown in the Figure) similar to the output interface 50 might be provided for controlling additional electrical loads.

The controller also comprises a communication interface connected to the microprocessor 56 for communicating and exchanging data with a suitable external electronic device (not shown in the Figure). This communication interface 66 allows for example a particular external device to interrogate the controller about stored consumption data and collect these data. The communication interface 66 also allows to modify remotely the operating parameters of the controller.

The method implemented by the controller can be summarized by the following steps:
  detecting the frequency of the AC supply and producing a signal indicative of this frequency;
  monitoring the detected frequency by reading the signal indicative of the frequency and producing frequency data derived thereof;
  selecting at least one of preprogrammed commands stored in memory with respect to the frequency data;
  producing at least one command signal representative of the selected preprogrammed commands; and
  controlling the load in response to the command signal.

This method presents advantages for grid management in that it avoids the need to imply in some instances an external intervener for operating the controllers in place. Indeed, the transmission of control signals is carried out directly through the already existing wiring provided by the electricity distribution grid, eliminating the requirements to use other communication means for allowing an efficient and instantaneous command directed to all the controllers.

With the controller according to the present invention, the broadcasting of control signals is done by producing an acceptable variation of the AC supply frequency provided by the grid. This variation can be for instance about 0.01 to 20% of the typical frequency of the AC supply. The frequency being a common element to every parts of the grid, this method allows to broadcast a common control signal from a sole operation and ensures its transmission to each controller connected to the grid. The controllers can be individually programmed to operate in accordance with the needs of each consumer.

In addition to this operation mode, the controllers can, by their analysis of the AC supply frequency, operate in critical situations to attempt avoiding an impending failure of the grid by reducing the electricity demand from the consumers. In general, the operations that can be carried out by the controller are accompanied with preprogrammed delays defining the speed and the dimension of their effect.

Figure 2:
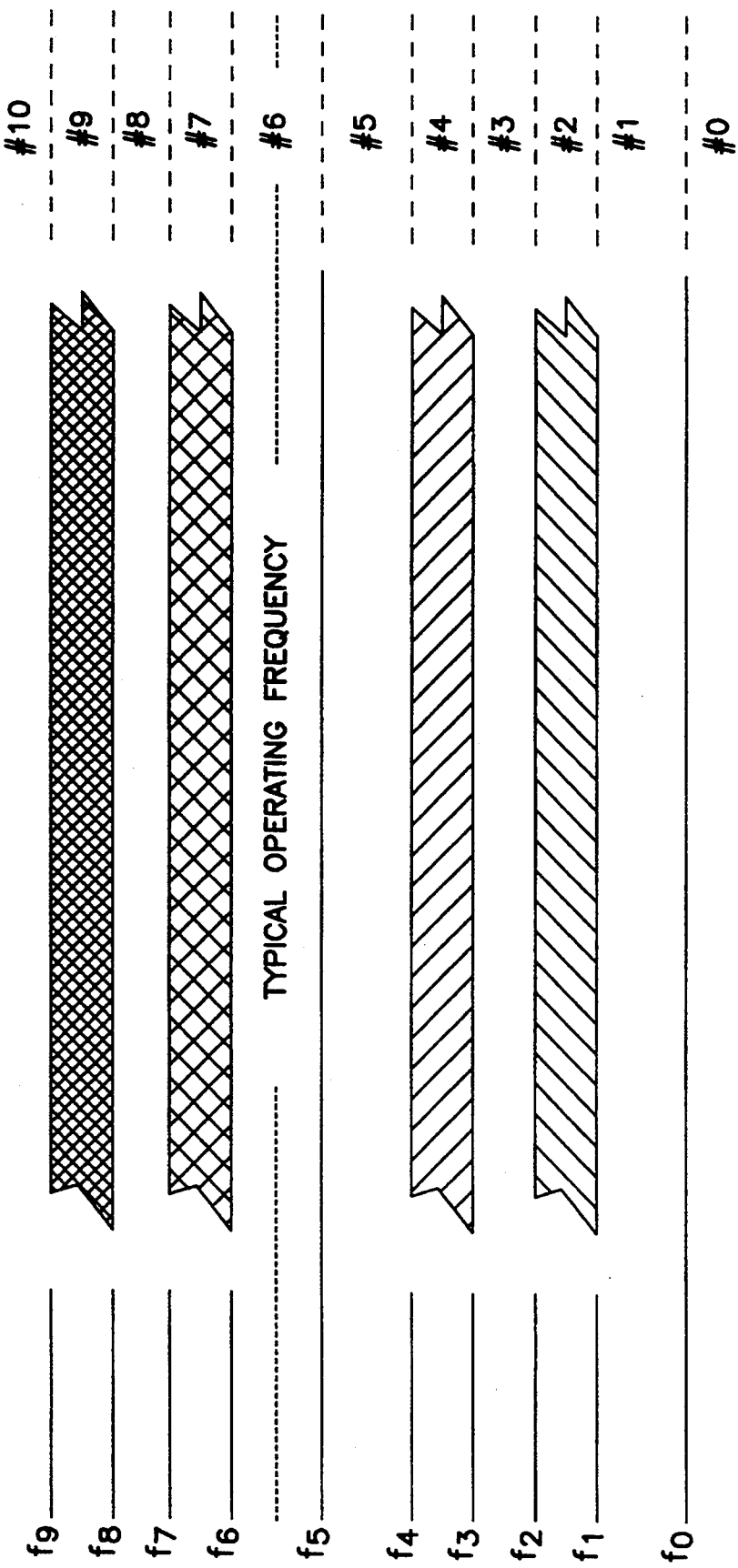
FIG. 2 illustrates a diagram useful in understanding a partitioning of frequency bands of interest for the controller according to the invention, around a typical frequency of an AC supply.

Referring to FIG. 2, the range of frequency in which the control signals are allowed is partitioned into 11 frequency bands (numbered from 0 to 10) around the typical frequency of the AC supply provided by the grid, depicted by the dotted line between the frequency values $f_5$ and $f_6$ limiting the frequency band #6. Each frequency band can be allotted to one of the specific functions provided by the controller for controlling the load(s). A function can be actuated for example by setting during at least a predetermined time period the frequency of the AC supply in the frequency band allotted to the function. This time period is useful for automatically validating the control signals since the undesirable signals generally have a short duration.

The controller should preferably provide two types of functions useful for the grid management. A first group of functions is programmed to take action when defective states of the grid are detected. A second group of functions is programmed to take action on predetermined variation of the AC supply frequency, intentionally produced by the power utility for achieving an effective management of the grid. Losses in the income of the power utility can thereby be reduced since cutoffs of equipment are done only at the appropriate time.

The first group of functions, which can be related to a protection mode of the controller, consists of the following functions and operations:

If the frequency of the AC supply provided by the grid is below the typical operating frequency, the load or loads are disconnected from the grid.

If the variation level of the frequency of the AC supply drops too steeply (corresponding to a frequency gradient too high), the load or loads are disconnected from the grid.

The reconnection of the load or loads to the grid is achieved differently depending on the following cases:

For a cutoff caused by the detection of a frequency lower than the typical operating frequency or a gradient too high, the reconnection is delayed for a relatively short time period for giving a chance to the power utility to localise a power failure source or to stabilize the grid. In this way, a large amount of the operating problems can be rendered invisible to the consumer.

After a power failure, the reconnection is delayed for a time period longer than the first one, for allowing the power utility to restore the grid successively by areas.

Power failures caused by possible overloads when attempting to restore the grid can be avoided by setting adequately the above-mentioned time periods.

Figure 3:
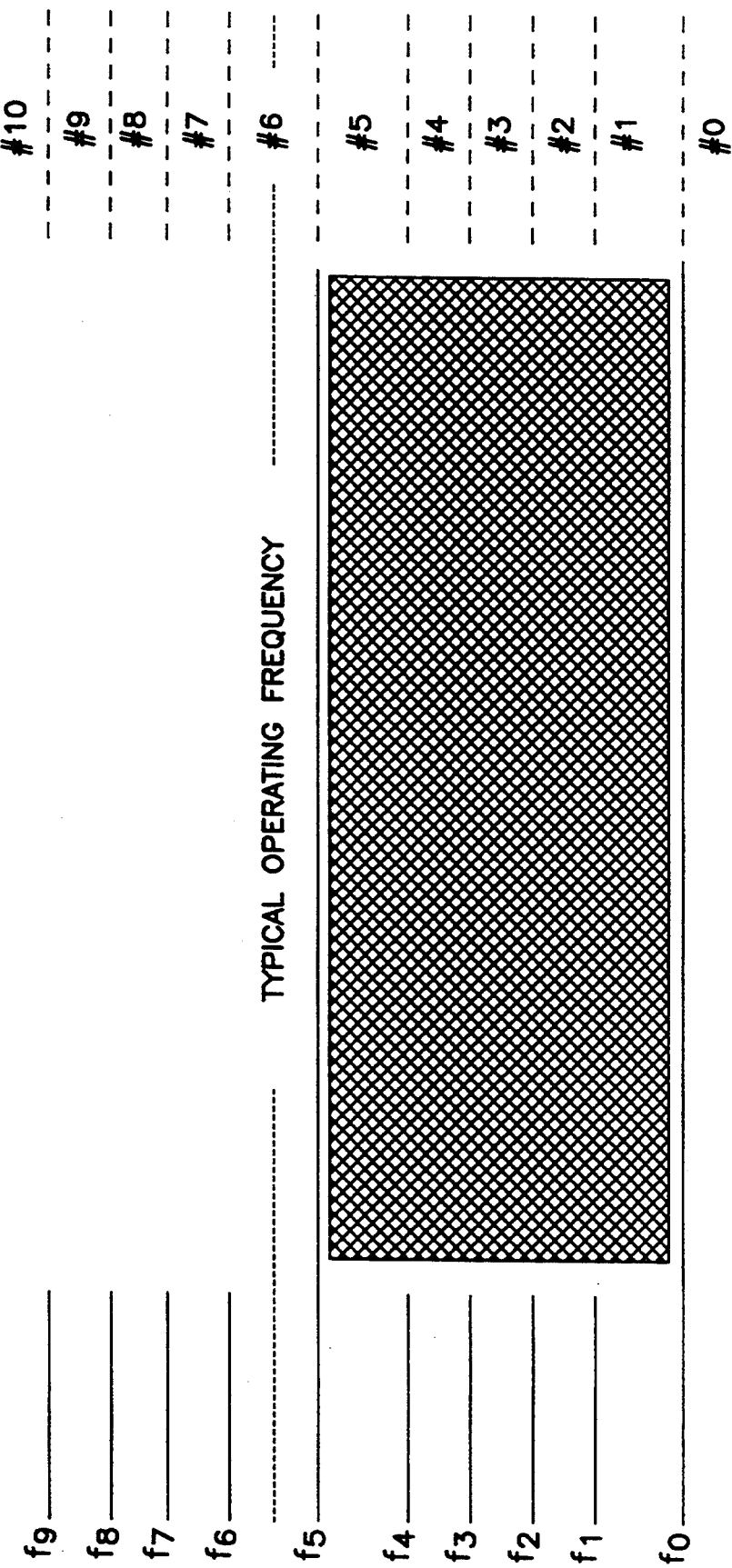
FIG. 3 illustrates a diagram useful in understanding the establishment of a hysteresis frequency effect below a typical frequency of the AC supply, for preventing normal frequency variations to affect operation of the controller according to the invention.

Referring to FIG. 3, a hysteresis effect is set up between frequencies $f_0$ and $f_5$ for preventing the controller to take action on frequency variations caused by normal disruptions on the grid. Thereby, the load or loads are disconnected from the grid only if the frequency of the AC supply drops below the frequency $f_0$ and once this action is achieved, the delay before reconnecting the load(s) to the grid is not started as long as the frequency of the AC supply remains below the frequency $f_5$.

The second group of functions, which can be related to a management mode of the controller, consists of the functions and operations that will be hereinafter described, in reference with their allotted band.

A real time clock embodied in the controller enables disconnection of the load(s) at programmed hours. This action can be cancelled if the frequency of the AC supply is set in the frequency band #7 in the minutes prior to the actuation of this function. Furthermore, the clock can be reset at need to a preprogrammed hour by setting the frequency of the AC supply in the frequency band #9.

Figure 7:
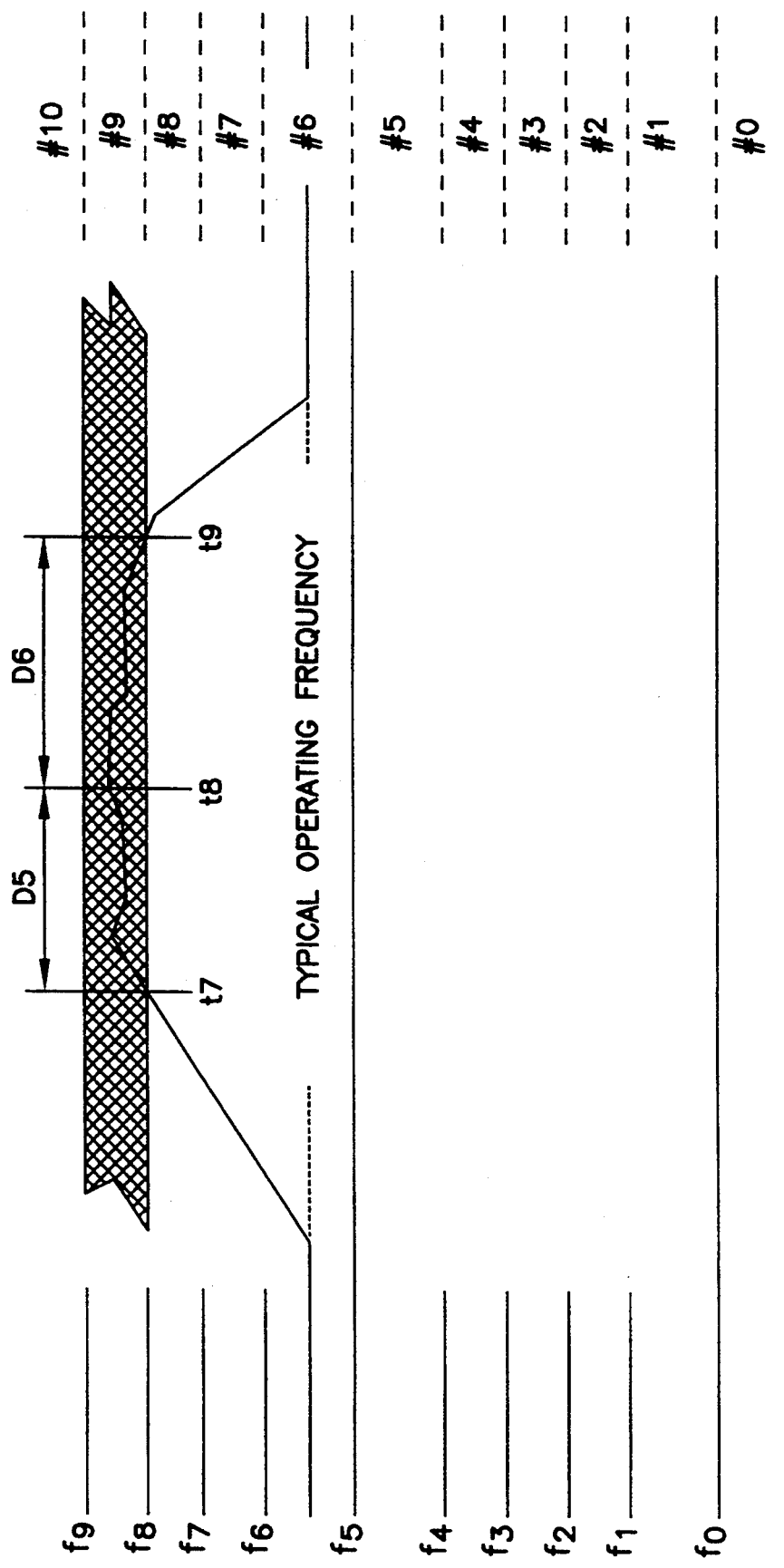

Referring to FIG. 7, the frequency band #9 is allotted to an update function of the real time clock hour of the controller. The actuation of this frequency band is achieved by setting the frequency of the AC supply provided by the grid between frequencies $f_8$ and $f_9$ during a preprogrammed time period D5 equal to the difference between times t7 and t8. Once the function of the frequency band #9 actuated, the controller enters in a wait state until the frequency of the AC supply exits from the frequency band #9. Once the controller detects this exit, the clock is updated. This means that delay D6 has no predetermined function. This delay is depicted only to suggest that it is possible to achieve a waiting in the frequency band for actuating the time update at the desired moment.

Figure 6:
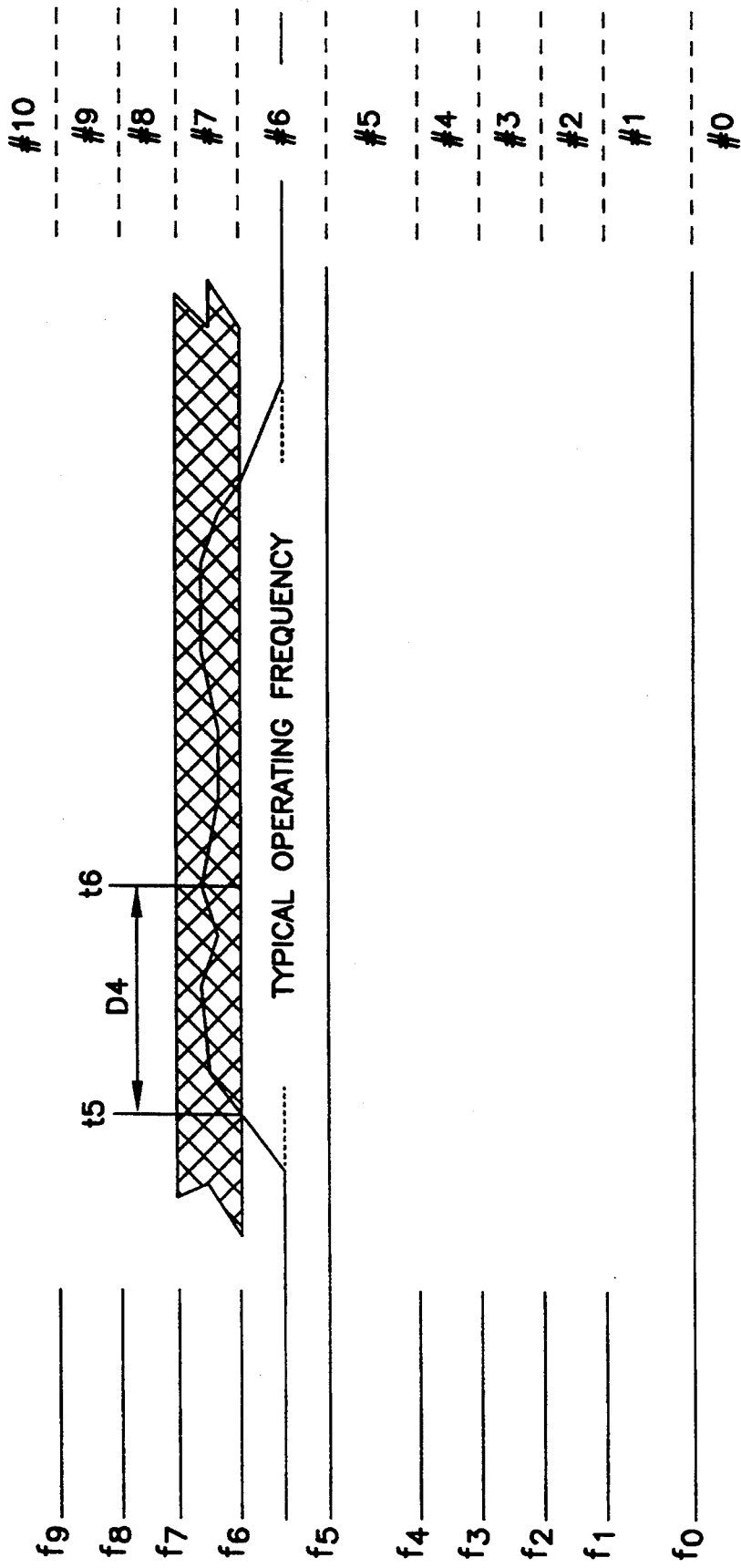

Referring to FIG. 6, the actuation of the frequency band #7 reactuates all the preprogrammed commands of the controller and forces reconnection of the load(s) to the grid. The actuation is achieved by setting the frequency of the AC supply in the frequency band #7 for a time period longer than D4. As soon as this time period D4 is exceeded by keeping the frequency of the AC supply in this frequency band, one of the timers 54 (shown in FIG. 1) starts counting for a predetermined time period in order to delay the reconnection of the load(s) to the grid. This time period is programmable and allows to ensure enough time for stabilization of the grid. After actuation of this function, no consideration is made any more of the possible presence of the frequency of the AC supply in this band, the desired action being already achieved. It is thus possible to keep the frequency of the AC supply in this frequency band for a delay longer than its actuation period without effecting the actions of the controller.

Figure 5:
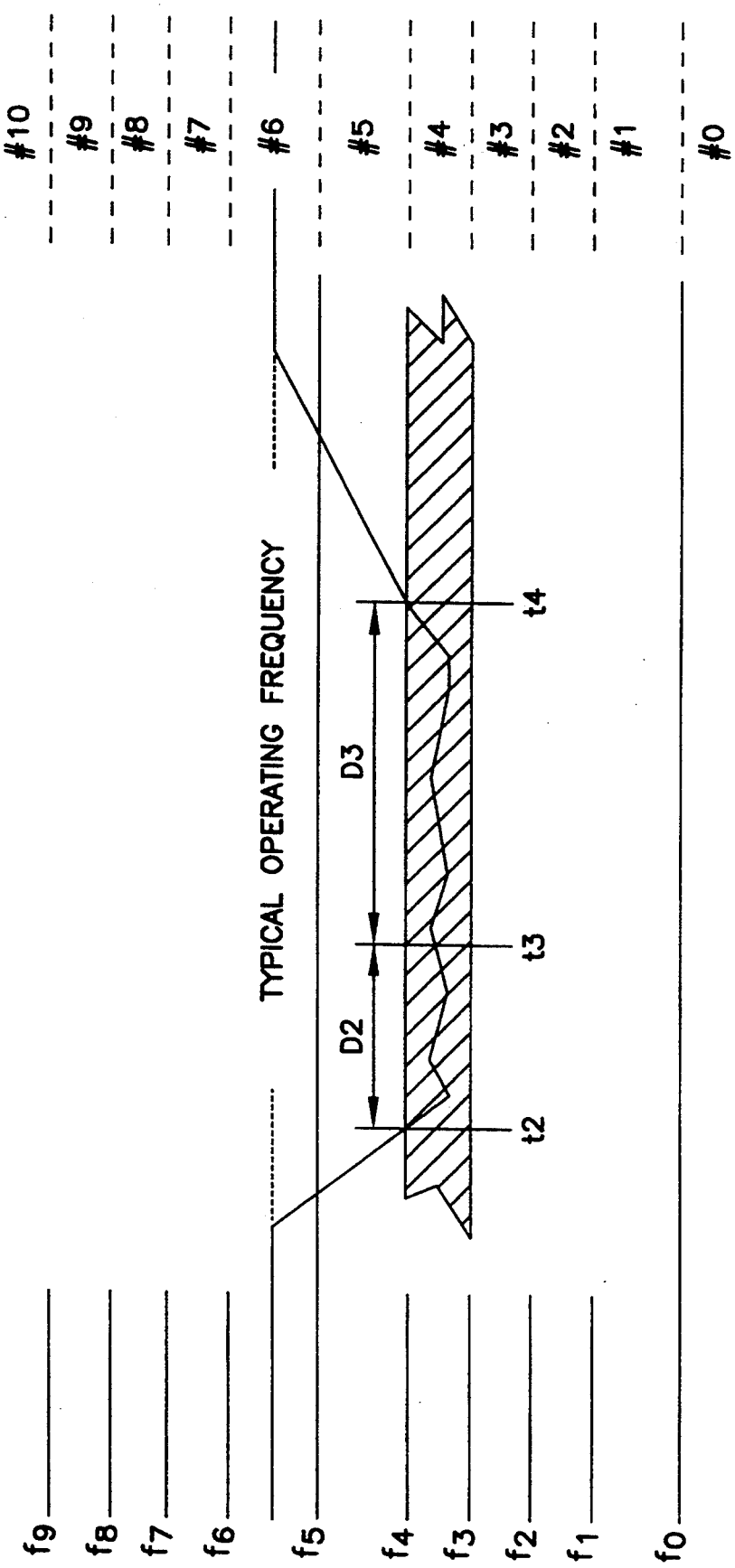

Referring to FIG. 5, the actuation of the frequency band #4 allows the power utility to command disconnection of the equipment from the grid for a preprogrammed time period. The actuation of this function is achieved by setting the frequency of the AC supply in this band for a time period equal to D2, so between the times t2 and t3. The duration of the disconnection of the equipment from the grid is calculated by multiplying a preprogrammed constant value by the delay D3 between times t3 and t4.

Figure 4:
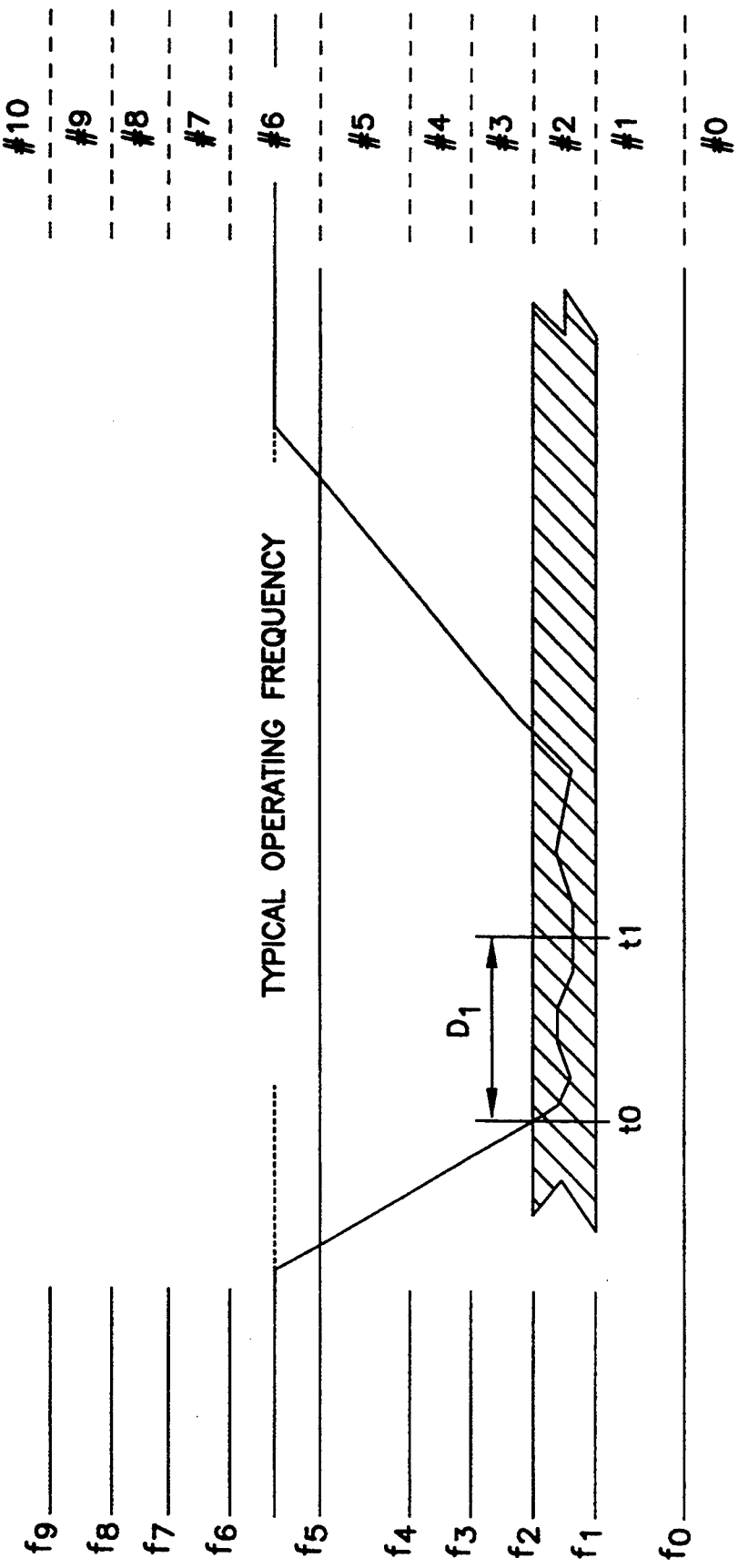
FIGS. 4 to 8 illustrate usage of the frequency bands allotted to functions embodied in the controller according to the invention, with examples of control signals for actuating these functions.

Referring to FIG. 4, the frequency band #2 is allotted to a function which disconnects the load(s) from the grid for an indeterminate time period. The only way to reconnect these load(s) to the grid is by actuation of the frequency band #7. As for the above-mentioned frequency bands, there is provided an actuation period which ensures validation of the command. This delay D1 is equal to the difference between times $t_0$ and $t_1$.

Figure 8:
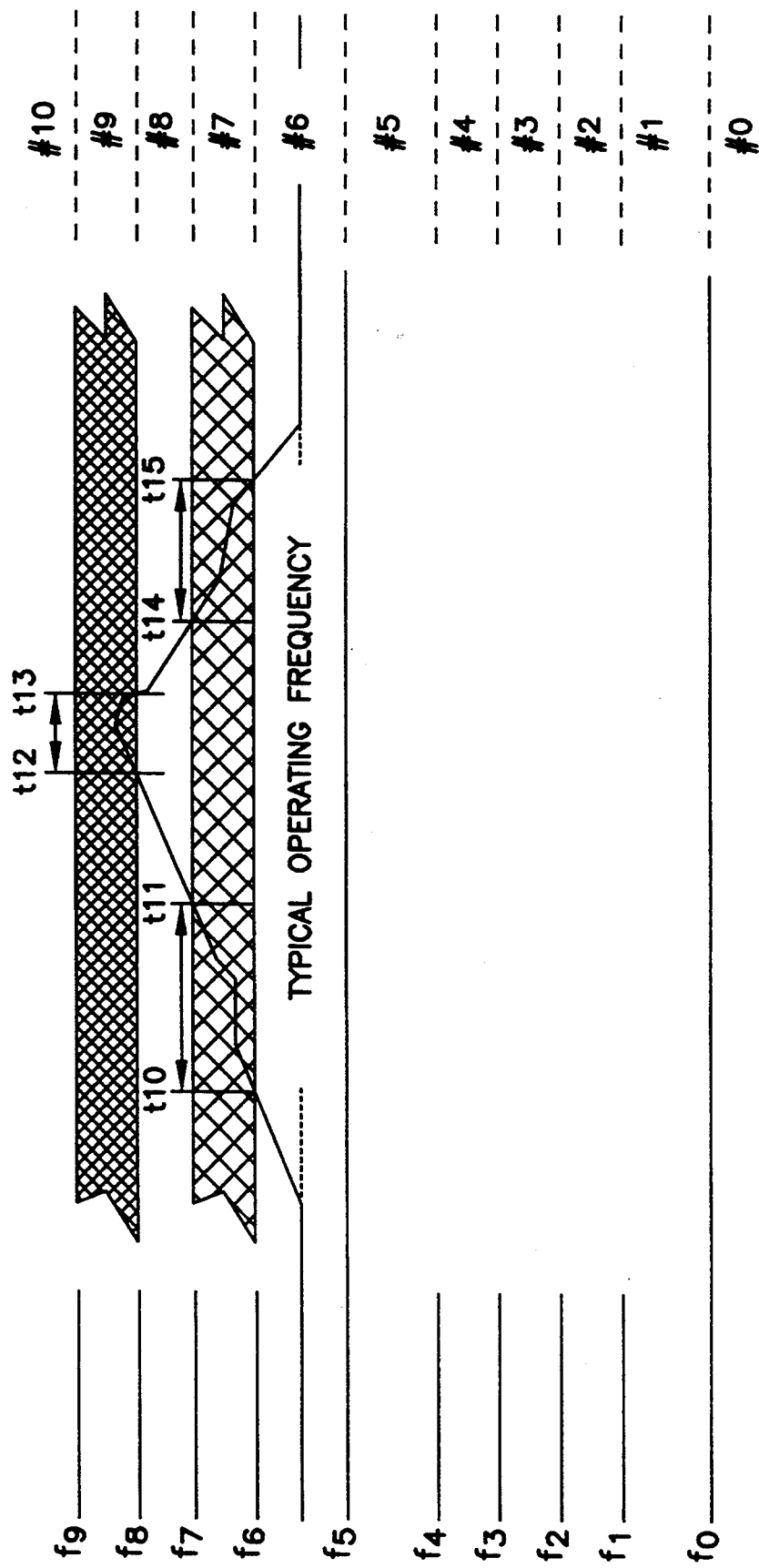

Referring to FIG. 8, there is shown an example of a passage of the frequency of the AC supply in various bands without affecting or creating instabilities of the controller. Indeed, if the time duration in which the frequency of the AC supply lays in a given frequency band is less than the time period needed to actuate the corresponding function, the controller remains in its prior state.

It should be pointed out that the partitioning of frequency bands, the functions and the above-mentioned time periods can be established or programmed according to the user's need. The allotment of the functions to the frequency bands can also be changed without difficulties.

Figure 9:
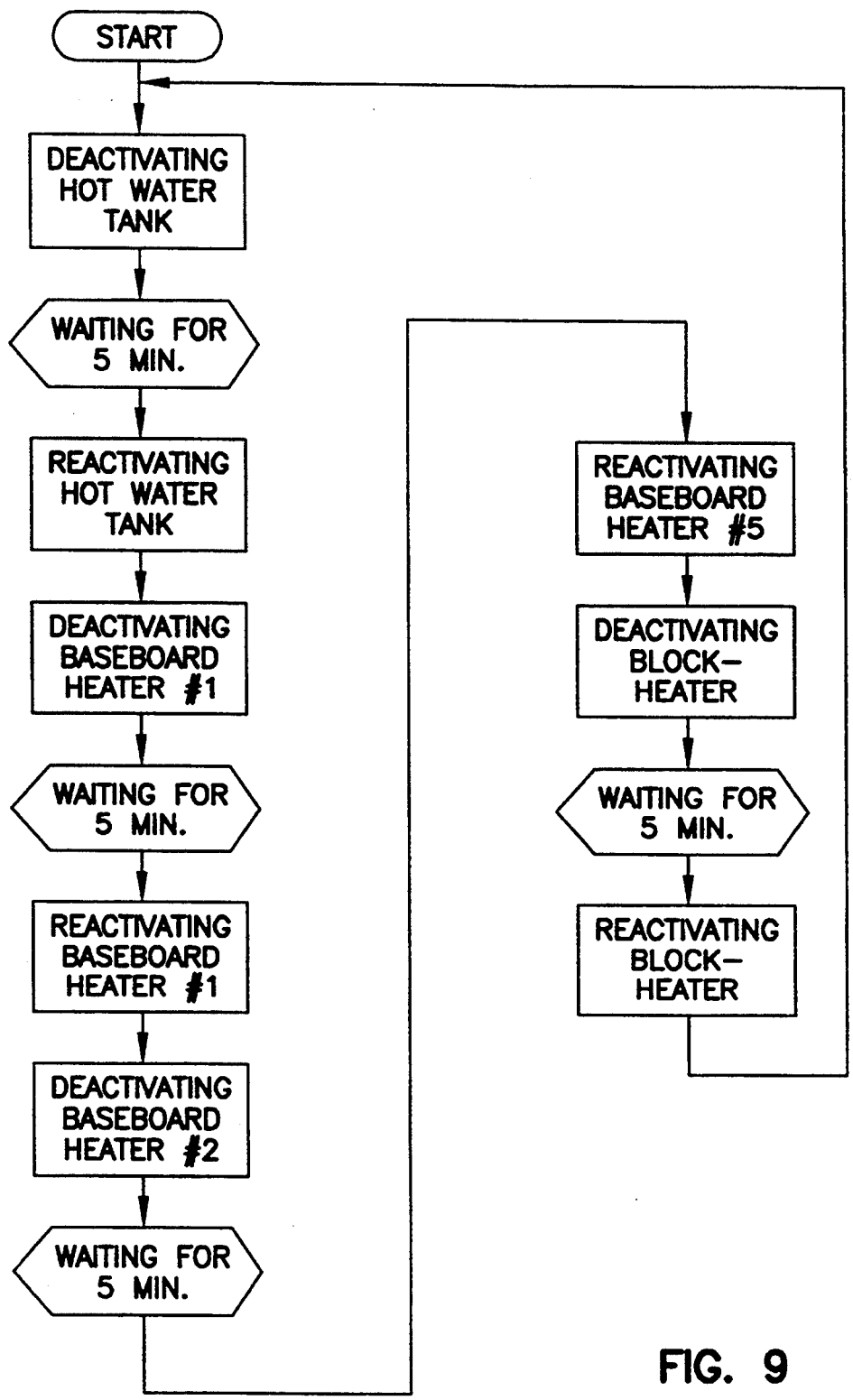
FIG. 9 illustrates a preprogrammed operation cycle that the controller according to the present invention can perform for saving energy.

Referring to FIG. 9, other useful functions might also be embodied in the controller for operating the load(s) during normal conditions of the grid. For example, the controller can achieve an energy saving operating cycle programmed beforehand, consisting of disconnecting one at a time the loads from the grid for a predetermined time period. In a case where the controller is connected to a hot water tank, five baseboard heaters and a block heater, a control cycle can be performed by deactivating the hot water tank for five minutes, reactivating the hot water tank and deactivating the first baseboard heater for another five minutes, reactivating the first baseboard heater and deactivating the second baseboard heater for five minutes, etc., and once all the operations of the cycle finished, starting over again the cycle until cancellation of this function. Such a cycle shows one of the various ways to save energy using the controller, without really disturbing the operation of the loads.

Although the present invention has been explained hereinafter by way of preferred embodiments thereof, it should be pointed out that any modifications to these preferred embodiments, within the scope of the appended claims, are not deemed to changer or alter the nature in scope of the present invention.

What is claimed is:

1. A controller for controlling operation of at least one electrical load operating on an AC supply having a typical frequency, said AC supply being provided via power transformers by an electrical power distribution grid, said controller being associated with said at least one load and comprising:
   an input interface including input terminals for connection to said grid, and an output for producing a signal representative of said AC supply and having the same frequency;
   frequency detecting means for detecting the frequency of said AC supply, said frequency detecting means having an input connected to said output of the interface, and an output for producing a signal indicative of said frequency;
   memory means for storing preprogrammed commands;
   frequency monitoring means connected to the output of said frequency detecting means, for reading the signal indicative of said frequency and producing frequency data derived thereof;
   selecting means connected to said frequency monitoring means and said memory means, for selecting at least one of said preprogrammed commands with respect to said frequency data, said selecting means comprising: means for detecting a substantial drop in the frequency of said AC supply below a threshold value and, on detection of said drop, selecting a first group of said commands for achieving a disconnection of said at least one load from said grid for a first predetermined time period; means for detecting whether a variation in the frequency of said AC supply exceeds a predetermined level and, on detection of said variation exceeding said level, selecting a second group of said commands for achieving a disconnection of said at least one load from said grid for said first predetermined time period; means for detecting an absence of said AC supply and, on detection of said absence, selecting a third group of said commands for achieving a disconnection of said at least one load from said grid for a second time period longer than the first time period; and clock and timer means for timing operations performed by said selecting means;
   control means having an output for producing at least one command signal representative of the at least one of said preprogrammed commands selected by said selecting means; and
   an output interface including an input connected to said output of the control means, and an output for connection to said at least one load, said output interface including means responsive to the command signal for controlling said at least one load;
   whereby said at least one load can be controlled by means of said controller depending on the frequency of said AC supply.

2. A controller according to claim 1, wherein said frequency detecting means comprise:
   means for detecting zero-crossings of said AC supply; and
   an interrupt handling circuitry having an input connected to said means for detecting zero-crossings, and an interrupt output for generating interrupt signals at time intervals with respect to said zero-crossings;
   and wherein said frequency monitoring means comprise:
   clock means for generating pulses at a constant frequency which is substantially higher than the typical frequency of said AC supply;
   counting means connected to said clock means, for counting the pulses; and
   means responsive to said interrupt signals, for determining the frequency of said AC supply or a variation thereof as a function of the pulses counted by said counting means during said time intervals, and producing said frequency data.

3. A controller according to claim 1, wherein said input interface comprises an opto-coupler connected between said input terminals and said output of the input interface, for substantially insulating said controller from said grid.

4. A controller according to claim 1, wherein said means responsive to said at least one command signal is a switch having open and closed states for respectively disconnecting from and connecting to said grid said at least one load.

5. A controller according to claim 4, wherein said switch is a relay.

6. A controller according to claim 1, wherein said output of said control means comprises a plurality of output ports, and further comprising additional output interfaces each including an input connected to one of said output ports, and an output for connection to a corresponding additional electrical load, each of said additional output interfaces including means responsive to a corresponding additional command signal for controlling said corresponding additional load.

7. A controller according to claim 2, wherein:
   said means responsive to the interrupt signals and said means for detecting a drop, a variation and an absence being a microprocessor provided with ROM, EEPROM and RAM memory modules.

8. A device according to claim 7, wherein:
   said input interface comprises an opto-coupler connected between said input terminals and said output of the input interface, for substantially insulating said controller from said grid.

9. A device according to claim 7, comprising a communication interface connected to said microprocessor, for communicating and exchanging data with a suitable external electronic device.

10. A method for controlling operation of at least one electrical load operating on an AC supply having a typical frequency, said AC supply being provided via power transformers by an electrical power distribution grid, said method comprising the steps of:
   detecting the frequency of said AC supply and producing a signal indicative of said frequency;
   monitoring the detected frequency by reading said signal indicative of the frequency, and producing frequency data derived thereof;
   selecting at least one of preprogrammed commands stored in memory means, with respect to said frequency data, said step of selecting comprising the steps of: detecting a substantial drop in the frequency of said AC supply below a threshold value and, on detection of said drop, selecting a first group of said commands for achieving a disconnection of said at least one load from said grid for a first predetermined time period; detecting whether a variation in the frequency of said AC supply exceeds a predetermined level and, on detection of said variation exceeding said level, selecting a second group of said commands for achieving a disconnection of said at least one load from said grid for said first predetermined time period; and detecting an absence of said AC supply and, on detection of said absence, selecting a third group of said commands for achieving a disconnection of said at least one load from said grid for a second time period longer than the first time period;

producing at least one command signal representative of the at least one of said preprogrammed commands selected; and controlling said at least one load in response to said at least one command signal;

whereby said at least one load can be controlled depending on the frequency of said AC supply.

11. A method according to claim 10, wherein said step of detecting comprise the steps of:

detecting zero-crossings of said AC supply; and generating interrupt signals at time intervals with respect to said zero-crossings;

and wherein said step of monitoring comprises the steps of:

generating pulses at a constant frequency which is substantially higher than the typical frequency of said AC supply;

counting the pulses; and determining the frequency of said AC supply or a variation thereof as a function of the pulses counted during said time intervals, and producing said frequency data.

12. A method according to claim 10, wherein said step of controlling comprises the steps of disconnecting from and connecting to said network said at least one load.

* * * * *